United States Patent [19]

Bernhard

[11] Patent Number: 5,521,579
[45] Date of Patent: May 28, 1996

[54] METHOD FOR PROVIDING GUIDING ASSISTANCE FOR A VEHICLE IN CHANGING LANE

[75] Inventor: Werner Bernhard, Stuttgart, Germany

[73] Assignee: Mercedes-Benz AG, Germany

[21] Appl. No.: 233,761

[22] Filed: Apr. 26, 1994

[30] Foreign Application Priority Data

Apr. 26, 1993 [DE] Germany ............. 43 13 568.4

[51] Int. Cl.⁶ .............. B60Q 1/00; G08G 1/16
[52] U.S. Cl. ............ 340/438; 340/435; 340/436; 340/901; 340/903; 180/167; 180/169; 364/424.01; 364/461
[58] Field of Search ............... 340/438, 436, 340/901–905, 435; 180/167–169, 271; 348/143, 148, 149, 169; 364/461, 460, 424.01, 424.02

[56] References Cited

U.S. PATENT DOCUMENTS

| | | | |
|---|---|---|---|
| 4,349,823 | 9/1982 | Tagami et al. | 340/903 |
| 5,177,462 | 1/1993 | Kajiwara | 340/903 |
| 5,309,137 | 5/1994 | Kajiwara | 340/903 |
| 5,375,060 | 12/1994 | Nöcker | 340/903 |

FOREIGN PATENT DOCUMENTS

| | | |
|---|---|---|
| 3028077 | 6/1987 | Germany . |
| 3622447 | 1/1988 | Germany . |
| 3832720 | 3/1990 | Germany . |
| 3902852 | 8/1990 | Germany . |
| 4005444 | 8/1991 | Germany . |
| 3622091 | 1/1994 | Germany . |

OTHER PUBLICATIONS

Von Fritz Ackermann, "Distance Control Using Radar", Spektrum d. Wiss., Jun. 1980, pp. 25–33.

Primary Examiner—Donnie L. Crosland
Attorney, Agent, or Firm—Evenson, McKeown, Edwards & Lenahan

[57] ABSTRACT

Method of assisting a motor vehicle in changing from a current lane to an adjacent target lane. The space in front and the space behind the vehicle at least in the adjacent target lane is monitored, the distance of objects (in particular vehicles) detected there, and their speeds are measured, and safety distances calculated therefrom. If all the measured distances are greater than the calculated safety distances, a possible lane change is signalled.

14 Claims, 3 Drawing Sheets

METHOD FOR PROVIDING GUIDING ASSISTANCE FOR A VEHICLE IN CHANGING LANE

BACKGROUND AND SUMMARY OF THE INVENTION

The invention relates to a process for providing guidance assistance for a vehicle in changing lanes from a current lane to an adjacent lane. In particular, the method according to the invention assists the driver of the motor vehicle when changing lanes (for example entering or exiting a motorway or passing a slower vehicle) by taking over, at least partially, certain monitoring requirements for this maneuver, and by evaluating the data acquired during the monitoring to help determine whether a risk-free lane change is possible.

German Patent Document DE 40 05 444 A1 discloses, for example, an arrangement in which the space behind the vehicle is monitored for the presence of objects, (principally, vehicles travelling behind) and the distance and speed of any such objects are determined. From this information, the deceleration which would have to be performed by a trailing vehicle when the driver's own vehicle changes lanes, and an associated evaluation index is formed. Incremental values of this index are displayed to provide the driver with audible or visual information on the effect of a possible lane change on the traffic behind. A laser-impulse distance measuring device serves to monitor the space behind.

In addition to ultrasonic and infrared systems (see for example DE 38 32 720 A1), the use of radar devices as monitoring detectors is also known. In addition to their use for monitoring the so-called blind-spot area (see for example DE 39 02 852 A1), the latter are also widely used for measuring distances from vehicles travelling ahead, such as for example for driving with automatic distance control (see F. Ackermann, Distance Control Using Radar, Spektrum d. Wiss., June 1980, pp. 25 et seq.) or for making recommendations with respect to passing, such as in the case of DE 36 22 447 C1 (monitoring of space in front by radar).

DE 36 22 091 A1 discloses a lane change warning system in which a monitoring detector can be switched between monitoring of a blind-spot area and monitoring of a space in front. Monitoring of the blind spot behind is selected during a lane change warning mode of operation, and monitoring of the space in front is selected in a distance warning operation mode, coupled to the switching of a fog lamp.

DE 30 28 077 C2 discloses a device for warning the vehicle driver of a vehicle travelling ahead of him in the current lane. In this arrangement, the space in front in the current lane is monitored by means of a radar device to detect the presence of a vehicle travelling ahead, and to determine its distance from the driver's own vehicle and its relative speed. As a function of these parameters and the speed of the driver's own vehicle (and, if appropriate, further parameters such as the state of the carriageway and brakes), a safe distance between the two vehicles is calculated and compared with the measured distance. If the measured distance is smaller than the safe distance, a warning signal is produced and/or the risk of an impact is displayed on a visual display panel.

In a variant of this known device, additional provision is made for detecting the risk of a collision in changing lanes, by monitoring the respective space behind in adjacent lanes as well as the space in front in the current lane. The detected data are evaluated in a manner analogous to that for the vehicle travelling ahead in the current lane. Thus, this device only takes into account the current situation in the space behind in a possible target lane.

The object of the present invention is to provide a process for assisting the operator of a motor vehicle when changing lanes, which process is capable of deciding automatically as to the advisability of a present or future lane change, and largely relieves the driver of the task of observing the surroundings and estimating distances and speeds.

This problem is achieved according to the invention by monitoring in the target lane both the spaces behind and in front of the driver's own vehicle, by determining the distance and speed of such objects (vehicles), and taking into account risk-preventing safety distances to be observed. This method is capable of detecting whether a sufficient gap is present in the target lane for a desired lane change. Thus, the driver does not need to observe the space behind or the space in front in the target lane, nor does he need to estimate the distances and speeds of the vehicles in it. Instead, he is informed by appropriate warning indications and/or instructions from the computer-controlled guiding assistance method of the presence of a sufficient gap in the target lane to accommodate a desired lane change.

According to the invention it is also possible to detect whether, if not in the current vehicle situation, a gap which is potentially suitable for lane change is possible in the target lane. That is, it is possible to detect the presence of a gap, permitting a lane change, in the target lane obliquely in front of, or obliquely behind the driver's own vehicle, and to indicate this to the driver. The driver can then attempt by means of suitable maneuvers (acceleration or deceleration of his vehicle) to align his vehicle with the gap and carry out the lane change. This relieves the driver of the vehicle in a particularly advantageous manner of the tasks of observing and evaluating the driving situation in the space in front and behind in the target lane.

In another embodiment of the invention, vehicles in the lane in which the driver's own vehicle is located before a lane change, are also included as factors to be considered. The search for a gap in this embodiment detects not only whether a suitable gap is present in the target lane, but also whether the position of the driver's own vehicle in the current lane (relative to vehicles which may be located there in the space in front or behind) permits him to reach such a gap, so that the driver is also relieved of the task of evaluating the driving situation in the current lane.

Advantageously, the question as to whether a detected gap, in the target lane, which is in principle sufficient for a lane change, can in practice even be reached by the driver maneuvering his car can also be taken into account. Thus, in another embodiment of the invention, possible future driving behavior for reaching the gap is analyzed in a computer simulation and tested as to whether the gap is actually reachable. In a further embodiment the acceleration or deceleration values necessary to accomplish a reachable lane change are displayed to the driver; or, alternatively, to further increase driving comfort, such information is passed on directly to a longitudinal movement controller device, which device is capable of automatically controlling the movement of the vehicle in the direction of travel without the intervention by the driver.

A particularly high level of driving comfort with respect to the control of the vehicle can be achieved by signaling to a device for controlling transverse movement of the vehicle that a gap which permits a lane change has been reached. The transverse movement control device can then automatically cause the vehicle to move into the gap in the target lane without the driver having to perform steering movements himself. In conjunction with a longitudinal movement control device which is actuated simultaneously, a method for completely autonomous vehicle control including possible lane changes is realized without need of controlling intervention by the driver.

Other objects, advantages and novel features of the present invention will become apparent from the following detailed description of the invention when considered in conjunction with the accompanying drawings.

DETAILED DESCRIPTION OF THE DRAWINGS

Figure 2:
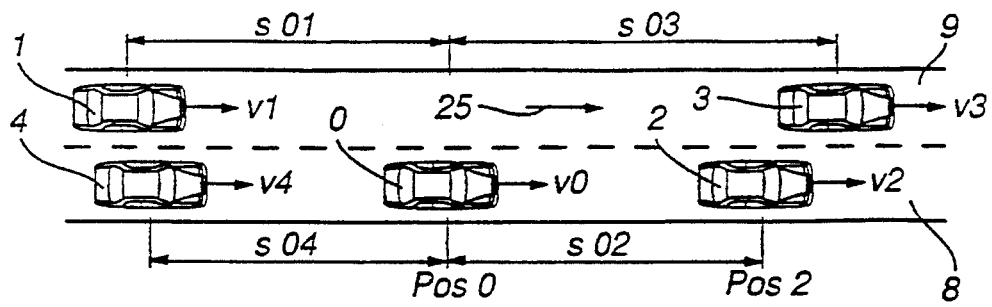
FIGS. 2 to 6 show different vehicle situations in order to illustrate the guiding assistance method.

In the illustrations in FIGS. 2 to 7, which depict the lanes of a highway, in each case a vehicle 0 is shown in a current lane 8, with a vehicle 2 travelling ahead in this current lane 8 and a vehicle 4 following, as well as a front vehicle 3 and a rear vehicle 1 in a target lane 9. The direction of travel is indicated in each case by the arrow 25. In FIG. 2, the respective distances s01, s02, s03, s04 of the driver's own vehicle 0 from the four other vehicles 1, 2, 3, 4 are shown.

Figure 7:
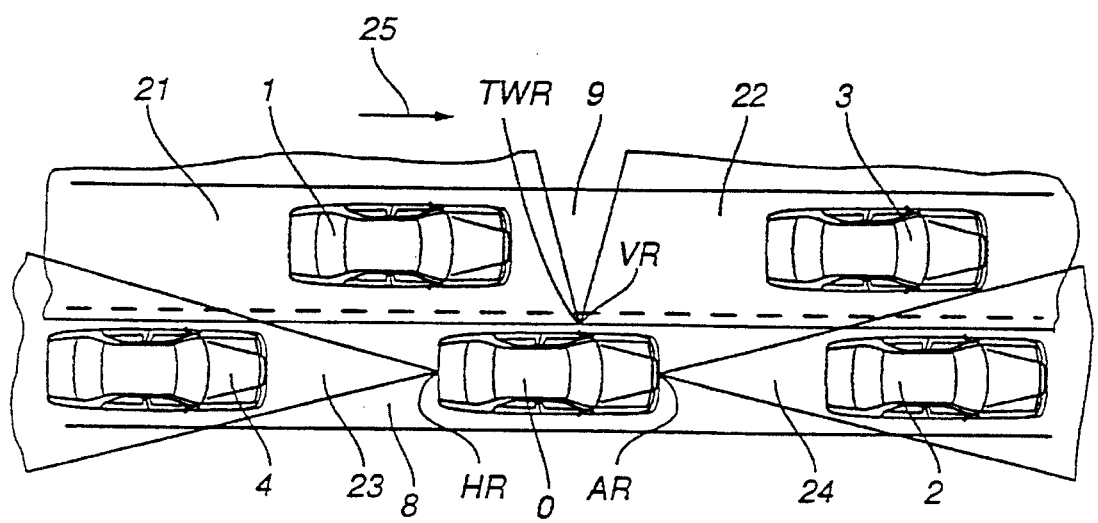
FIG. 7 shows a diagrammatic illustration of the monitored areas used by the method according to the invention.

In FIG. 7, it can be seen that the driver's own vehicle 0 has a rear-mounted radar device (HR) for monitoring the space 23 behind in the current lane 8, a distance radar device (AR) for monitoring the space 24 in front in the current lane 8, a blind-spot radar device (TWR) for monitoring the space 21 behind in the adjacent target lane 9, and a forward-directed radar device (VR) for monitoring the space 22 in front in the target lane 9. These devices detect the presence of objects in the respective area covered by them, and also permit the distance from the object to be determined. (The term object here includes both other vehicles and stationary obstacles which may be encountered, for example at the end of a lane.) The blind-spot radar and the forward-directed radar (TWR, VR) are integrated in the exterior mirrors. The angle of the radar lobe is sufficiently large to reduce the blind spot. The monitoring of the space behind requires that the blind-spot radar have a range in the longitudinal direction of at least approximately 100 m.

Figure 1:
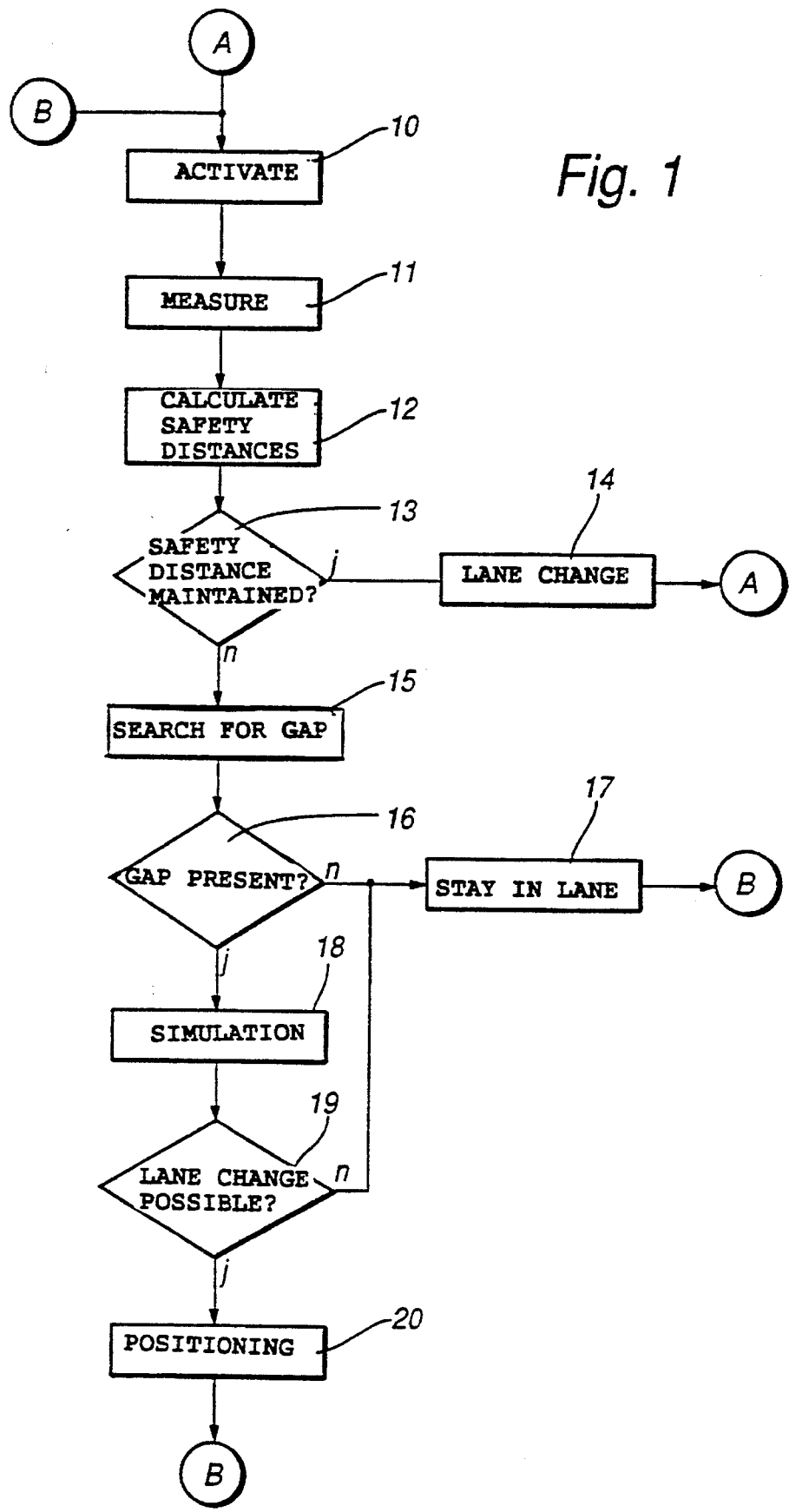
FIG. 1 is a flow chart which shows a computer-controlled guiding assistance method for a lane change according to the invention.

The mode of operation of the method according to the invention for computer-assisted guiding assistance for a driver's motor vehicle 0 when changing from the current lane 8 to the adjacent target lane 9 (which in the case shown constitutes a passing lane located to the left of the current lane 8 in the direction of travel) is explained in detail below with reference to the program sequence plan of FIG. 1.

The method is initiated in step 10 by activation of a travel direction indicator lever, which also simultaneously triggers a travel direction indicator. Alternatively, the system may be activated simply by tapping a travel direction indicator lever without the travel direction indication being triggered so that the operators of adjacent vehicles are not confused by the intention of a possibly imminent but not yet realizable lane change. In the latter case, a travel direction indication is not issued until a gap is detected for a possible lane change and the driver's own vehicle has reached the position required for the lane change.

Actuation of the system is preferably cancelled if it has not been possible to find a gap within a predetermined time, after which the driver is requested to repeat the command if he still intends to change lane. If, on the other hand, the operators of adjacent vehicles are informed of the imminent intention to make a lane change by the immediate lighting of the travel direction indicator, the other operators may react differently, either by leaving space for a sufficient gap or else by closing a gap which may be present, thus making a lane change impossible.

In an alternative embodiment of the invention, the system remains continuously activated and only the data output to corresponding display devices or vehicle movement-controlling devices is actuated in each case by the request for an indication of a change in travel direction. In this embodiment, the computer and the data lines are continuously occupied and ready. If, on the other hand, the system is activated only in response to the request for a travel direction indication, it can be used in the meantime for other purposes. It is to be noted at this point that the method can be carried out by means of a customary vehicle-mounted computer system, such as is known for example for the purpose of automatic distance-controlled driving, for which reason a detailed description of the system components is dispensed with here.

The request for activation of the travel direction indicator can be communicated to the driver, if desired, by the forward-directed monitoring in the current lane 8 if it is detected during this process that there is an object 2 in this area 24 in front which is moving more slowly in the direction of travel than the driver's own vehicle 0.

After activation of the system, in step 11, the distances s01, s02, s03, s04 to the objects 1 to 4 are detected in the monitored areas 21 to 24, and their relative speeds with respect to the driver's own vehicle 0 are measured by means of the radar devices. (The driver's own speed vO is determined by means of the speedometer.) In order to retain the data for these variables, the raw data from the radar devices are preprocessed according to their purpose, faults (for example due to signal reflections) are filtered out, and sufficient plausibility tests are carried out. For example, the objects 1 to 4 detected when cornering are assigned to the respective lane by means of the steering angle. If the relative speed of an object is equal and opposite to that of the driver's own vehicle, the object is interpreted as a stationary obstacle or the end of a lane, for example a merge lane. If contradictory signals occur which cannot be evaluated, this fact is indicated to the driver if he has actuated the travel direction indicator. Vehicles travelling in the opposite direction on an oncoming carriageway can be blanked out or a warning signal can be triggered when the travel direction indicator is actuated.

In step 12, the safety distances sw01, sw02, sw03, sw04 are calculated from the distance and speed data acquired in the previous step. For this purpose, initially the absolute speeds v1, v2, v3, v4 of the other vehicles and detected objects 1 to 4 are calculated from the relative speeds and the vehicle's own speed v0. Subsequently, the safety distances are determined in each case as the sum of a reaction distance, a residual distance, a braking distance differential and a distance for coasting to a standstill.

The reaction distance is obtained from the product of a reaction time and the speed of a trailing vehicle. (A customary driver's reaction time of approximately 1.8 s, for example, can be used for this purpose.) When starting a distance control, the shortest system reaction time can be used. The residual distance constitutes a safety margin, which is typically set at approximately 5 m. Braking distance differential is the difference between the braking distances for full braking of the two vehicles (between which the safety distance has just been detected), the maximum braking deceleration, for example typically 3 m/s$^2$ being specified or, if the driver's own vehicle 0 has appropriate devices, being determined automatically by means of the coefficient of friction dependent on the state of the road. Finally, the distance for coasting to a standstill is obtained from non-driven rolling of the vehicles with a reasonable deceleration which is typically 1 m/s$^2$. With these specified parameters (of which, incidentally, the residual distance and the reaction time can be matched by means of an adaptive control), the system computer calculates the safety distances sw01 to sw04 of the driver's own vehicle 0 from each of the detected objects or vehicles 1 to 4.

In step 13, the measured distances s01 to s04 are compared with the calculated safety distances sw01 to sw04 to determine whether the safety distances have all been maintained. If the driver's own vehicle 0 has a distance controller device, for example in conjunction with a speed control, the safety distance sw02 from the vehicle 2 travelling ahead in the current lane 8 is automatically maintained and it is necessary only to check the other distances. If the computer determines that all the measured distances are at least as great as the respectively associated calculated safety distances, it signals that a lane change can be made in the current situation and indicates this to the driver appropriately. He can then carry out the lane change in a following step 14, after which the system returns again to the point A before the actuation of the system.

When carrying out this step it may be advantageous not to use precisely calculated values for the safety distance but rather, in particular during a lane change, to determine the distance boundaries according to a plausibility test somewhat imprecisely or to provide them with hysteresis properties. Furthermore, the inclusion of acceleration processes, which have already been started, of individual vehicles in the calculation of the safety distances can be useful to the flow of traffic.

If, on the other hand, the computer has calculated that one of the measured distances is smaller than the associated safety distance, a current lane change is not possible. In such case, in step 15 the method according to the invention then searches for a gap in the target lane sufficient to permit a lane change, even though it is not already adjacent to the driver's own vehicle 0. (Such a gap may possibly be located, for example, obliquely in front of or obliquely behind the driver's vehicle 0 and is basically also accessible to the driver's vehicle 0.) For this purpose, the following measured distances and calculated safety distances are summed and compared by the computer. First, the sum s01+s03 of the measured distances to the vehicles 1, 3 in the target lane 9 and the sum sw01+sw03 of the associated calculated safety distances are calculated. The computer compares both sums and detects the presence of a gap in the target lane 9 if the sum of the measured distances is greater than the sum of the calculated safety distances. Second, it calculates the sum s01+s02 of the measured distances between the vehicle 1 behind in the target lane 9 and the vehicle 2 which is travelling ahead in the current lane 8, and likewise in turn calculates the associated sum sw01+sw02 of the calculated safety distances. The same process is carried out as a third step with the distances of the two other vehicles 3, 4. Both sums s01+s02, s03+s04 of the measured distances are then in turn compared in each case with the associated sum of the calculated safety distances, and if it is detected in both cases that the sum of the measured distances is greater than the sum of the associated calculated safety distances, it is determined to mean that space is available for the driver's own vehicle 0 to accelerate or decelerate, as a result of which it may be possible to reach the detected gap in order to change lanes.

If, in one or more of the three comparisons of this interrogation step 16, the sum of the measured distances is smaller than the sum of the calculated safety distances, it is determined to mean that under the set parameters (for example reaction time, safety margin, residual distance, the driver's acceleration or deceleration and reasonable deceleration of the other vehicles), a lane change is not possible. In consequence, in a following step 17, the instruction to stay in lane is issued to the driver. The system then returns to point B before the measurement step 11 and the process is repeated, during which new measurement data, which may arise from possible changes in the positions or speeds of the vehicles, are acquired.

If, on the other hand, in step 16 for all three comparisons the measured distances is greater than that of the calculated safety distances, it is determined that a gap is currently available for a lane change, and can be reached after suitable vehicle maneuvers have first been carried out (in particular, an acceleration or deceleration). This can be signalled to the driver by the system, for example by means of an LED.

The method according to the invention provides extensive assistance to the driver in determining suitable maneuvers by which his own vehicle 0 can reach the gap which is present in the target lane 9. For the latter purpose, after a positive response in the preceding interrogation step 16, a computer simulation step 18 determines whether a gap was basically present, taking into account possible future actions (for example accelerations, declarations or lane changes) of each of the vehicles 0–4 during the period until the gap is reached.

This is a highly non-linear problem, since a change in the vehicle's own speed means at the same time a change in the calculated safety distances. Even when the speed of the other vehicles remains constant, such an increase in the vehicle's own speed v0 can occur that even though the gap remains the same size, the safety distances from the vehicles travelling ahead may no longer be maintained, or that the specified acceleration is not sufficient to carry out the change in position within a period in which the change in traffic situation permits a lane change. In both cases, an initiated passing process would have to be aborted. Thus, the simulation which is calculated in advance in the time accelerator is appropriate at this point. For this purpose, the radar devices according to FIG. 7 detect the current traffic situation, including the distances and speeds of the other vehicles, and on the basis of this information, it is determined in the simulation whether, and by means of which activities, it may become possible for the driver to enter the gap which has been found.

In this simulation, a negative acceleration value (that is, a deceleration) is prescribed if the calculated safety distances from the vehicles 1, 4 behind can both be maintained. If, on the other hand, the safety distances from the two front vehicles 2, 3 are satisfied by the measured distances, a positive acceleration value is prescribed. Thus, the traffic behavior is simulated in advance, specifically in the longest case until, when accelerating, the distance from the vehicle 2 travelling ahead in the current lane 8 or, when decelerating, the distance from the vehicle 4 following in the current lane 8, drops below the respective associated safety distance. If the existing gap is not reached by this time, when accelerating a new simulation cycle with an incrementally increased acceleration value is carried out. The interrogation step 19 as to a possible lane change, on accelerating, is not ultimately answered negatively (and the driver in turn given the instruction in step 17 to stay in lane) until it has been determined that it is not possible to reach the gap after a set upper limit for the acceleration value (which results for example from the smallest value of the engine output threshold, the threshold of the coefficient of friction or an individual comfort threshold) has been reached or after a prescribed maximum speed has been reached.

On the other hand, for reasons of driving comfort the deceleration in the simulation is not increased incrementally in the manner described above, but is set right at the beginning to a value which is still advantageous for comfort. If the gap is not reached after the single deceleration simulation cycle, the instruction to stay in lane is issued to the driver again.

If, on the other hand, it is determined by the simulation in the interrogation step 19 that a lane change is possible by means of a simulated vehicle maneuver, the data determined for such change, relating to the vehicle acceleration or deceleration, are output, for example, to a display device for the driver, who can subsequently set the required acceleration or deceleration value and perform the maneuver to reach the gap in the target lane under his own control. This realization of the previously simulated vehicle maneuver is shown in step 20 of the positioning in the flow chart in FIG. 1.

If, on the other hand, the vehicle has a longitudinal movement control device for automatic movement of the vehicle in the longitudinal direction, the data can be output to such longitudinal movement control which automatically moves the vehicle onto the acceleration or deceleration value detected in the simulation. The system then returns to point B before the measurement step 11 and the process is repeated to detect that the sufficient gap has been reached and to be able to perform the desired lane change.

A completely autonomous vehicle control, including lane changes without need of any intervention of the driver, is possible if the vehicle also has a transverse movement control device. In such case, when it is detected that a lane change is possible, this information is signalled to the transverse movement control device, and the lane change is carried out automatically by the longitudinal movement controller and transverse movement controller of the vehicle, possibly after an appropriate request from the driver.

The process according to the invention is explained below with respect to different traffic situations according to FIGS. 1 to 6.

FIG. 2 shows an example in which it is presumed that all the safety distances are maintained. The execution of the method described above detects the gap in the adjacent (here left-hand) target lane 9, and thus the possibility of an immediate lane change.

Figure 3:
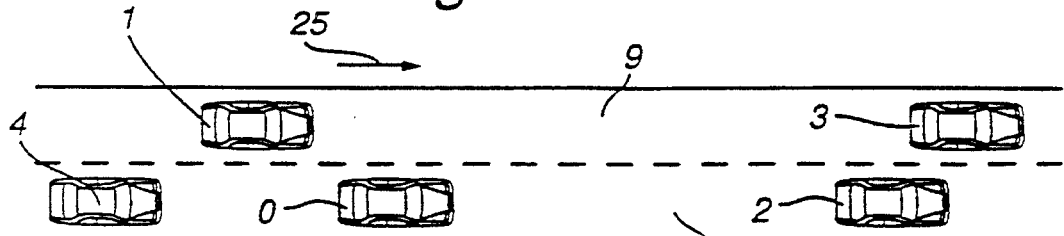

In the case in FIG. 3, the required safety distance from the vehicle 1 behind in the target lane 9 is not satisfied, and the system thus detects that an instantaneous lane change is not possible. However, the gap search step 15 detects a suitable gap located obliquely in front of the driver's own vehicle 0. The measured distance from the vehicle 2 travelling ahead in the current lane 8 allows sufficient distance for acceleration. In the subsequent simulation, it is determined whether it is possible to position the vehicle in this gap at a safe distance from all the other vehicles; and if so, with what acceleration.

Figure 4:
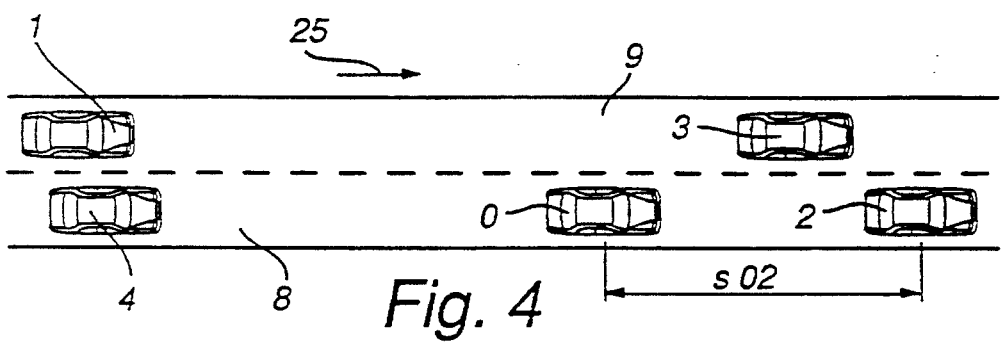

In the traffic situation in FIG. 4, the safety distance from the vehicle 3 travelling ahead in the target lane 9 is not sufficient, and the system detects in turn that an immediate lane change is not possible. The subsequent search for a gap in step 15 (FIG. 1) determines that a suitable gap is located obliquely behind the driver's own vehicle 0. The measured distance from the vehicle 4 travelling behind in the current lane 8 turns out to be considerably greater than the calculated safety distance, so that sufficient distance is available for deceleration. In the subsequent simulation, it is determined whether it is possible to position the vehicle in the gap at a safe distance from the other vehicles by means of the preselected deceleration or simply by waiting.

Figure 5:
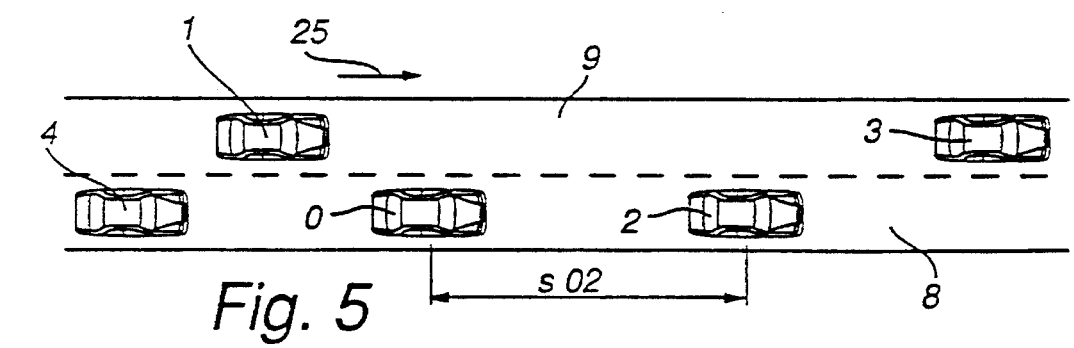

In the case in FIG. 5, as in the case in FIG. 3, the presence of a suitable gap is detected obliquely in front of the driver's own vehicle 0. The distance to the vehicle 2 travelling ahead in the current lane 8 corresponds, however, approximately to the calculated safety distance, so that there is insufficient distance available for acceleration, and a safe lane change is not possible (step 19). In this case, an instruction to stay in the current lane 8 is issued to the driver.

Figure 6:
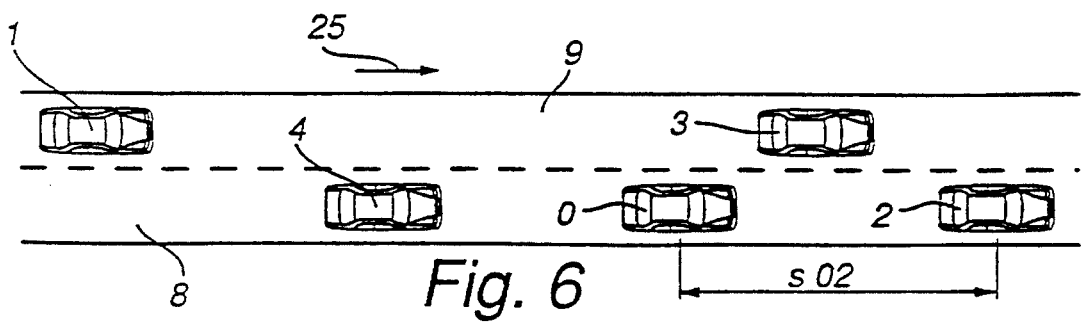

In the situation in FIG. 6, as in FIG. 4, the presence of a suitable gap is detected obliquely behind the driver's own vehicle 0. However, the measured distance from the vehicle 4 travelling behind in the current lane 8 corresponds already approximately to the calculated safety distance, so that there is insufficient distance available for deceleration, and the question of a possible lane change is again answered negatively. In this case the vehicle also has to stay in the current lane 8.

The method can of course, as to a certain extent already indicated, be used in conjunction with distance-controlled driving and a speed controller. In the same way as for changing into a left-hand target lane, a lane change to the right-hand target lane can be brought about by the method if the driver's own vehicle has appropriate radar detection devices on the right-hand side, the actuation then taking place in response to the request for an indication of a change in travel direction to the right. Usually, the speeds of the vehicles in the right-hand target lane are lower, and the computer simulation is therefore modified so that a deceleration is preselected if the current speed of the driver's own vehicle is higher than the speed preselected on a speed controller.

It is also possible, on multi-lane roads such as for example highways in the U.S.A. on which passing on the right is permitted, for the method to detect, by means of the simulation via the computer, the lane which is currently most suitable for passing, and to propose this to the driver or to the transverse movement controller device of the vehicle which may be present.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method of assisting a motor vehicle in changing from a current lane in which the vehicle is operated, to a target lane adjacent thereto, comprising the steps of:

monitoring a space behind and a space in front of said vehicle in at least the target lane, to detect presence of objects therein;

determining speeds of detected objects in said target lane and of said vehicle;

determining distances of the detected objects in said target lane from said vehicle;

calculating for each detected object in said target lane a safety distance from said vehicle based on determined speed of said object, a predetermined reaction time and a predetermined deceleration value;

comparing the determined distance of each detected object in said target lane with the safety distance calculated therefor;

if at least the determined distance of each detected object in said target lane is greater than or equal to the calculated safety distance for said object, activating a signal to a driver of said vehicle, indicating that a lane change is possible; and if the determined distance of at least one detected object in said target lane is smaller than the calculated safety distance for said object, performing the additional steps of:

comparing at least a first sum of the determined distances of said detected objects in said target lane with a first corresponding sum of the safety distances calculated for said detected objects;

if said at least a first sum of said determined distances is greater than said first corresponding sum of calculated safety distances, activating a signal to said driver, indicating that a lane change is possible; and if at least the determined distance of any detected object in the target lane is less than the calculated safety distance for said object, and if said at least a first sum of determined distances is not greater than the first corresponding sum of calculated safety distances, activating a signal indicating that a lane change is not possible.

2. Method according to claim 1 further comprising the steps of monitoring a space behind and a space in front of said vehicle in said current lane to detect presence of objects therein;

determining speeds of detected objects in said current lane;

determining distances of detected objects in said current lane from said vehicle; and calculating for each detected object in said current lane a safety distance from said vehicle based on the determined speed of said object, a predetermined reaction time and a predetermine deceleration value;

wherein said second comparing step further comprises the steps of:

comparing a second sum of said determined distances of an object detected in the space behind said vehicle in the target lane and of an object detected in the space in front of said vehicle in the current lane, with a second corresponding sum of the calculated safety distances for said objects; and comparing a third sum of said determined distances of the object detected in the space behind said vehicle in the current lane and the object detected in the space in front of said vehicle in the target lane 9, with a corresponding sum of the calculated safety distances for said objects; and wherein said second activating step comprises activating said signal indicating that a lane change is possible when each of said first, second and third sums of determined distances is greater than the respective corresponding first, second and third sum of calculated safety distances.

3. Method according to claim 1, wherein the safety distances are each calculated as the sum of a reaction distance, a braking distance differential for full braking, a distance for coasting to a standstill and a residual distance serving as safety margin.

4. Method according to claim 2, wherein the safety distances are each calculated as the sum of a reaction distance, a braking distance differential for full braking, a distance for coasting to a standstill and a residual distance serving as safety margin.

5. Method according to claim 2, comprising an additional step of automatically controlling position of said vehicle relative to an object detected in front of said vehicle in the current lane whereby the determined distance of a detected object in the space in front of said vehicle in the current lane is kept greater than or equal to that of the calculated safety distance for said object, by controlling acceleration and deceleration of said vehicle.

6. Method according to claim 3, comprising an additional step of automatically controlling position of said vehicle relative to an object detected in front of said vehicle in the current lane whereby the determined distance of a detected object in the space in front of said vehicle in the current lane is kept greater than or equal to that of the calculated safety distance for said object, by controlling acceleration and deceleration of said vehicle.

7. Method according to claim 2, wherein a computer simulation of a lane change is carried out in response to a signal indicating a possible lane change, to determine an acceleration or deceleration said vehicle which may be required for said lane change.

8. Method according to claim 5, wherein a computer simulation of a lane change is carried out in response to a signal indicating a possible lane change, to determine an acceleration or deceleration said vehicle which may be required for said lane change.

9. Method according to claim 7 wherein in said simulation:

a deceleration of said vehicle is selected if both of the determined distances of the objects in spaces behind said vehicle both in the target lane and in the current lane are greater than the corresponding calculated safety distances of said objects; and an acceleration of said vehicle is selected if both of the determined distances of the objects in spaces in front said vehicle in the target lane and in the current lane are greater than the corresponding calculated safety distances of said objects.

10. Method according to claim 9, wherein the simulation is repeated, with incrementally increased values of acceleration or deceleration if no possible lane change has been achieved with a previously selected value.

11. Method according to claim 9, wherein in the event of a possible lane change which has been found by said simulation, the detected acceleration or deceleration value is illustrated on a display device.

12. Method according to claim 9, wherein in the event of a possible lane change which has been found by said simulation, the detected acceleration or deceleration value is passed on to a longitudinal movement controller device of said vehicle for automatic acceleration or deceleration of the same.

13. Method according to claim 11, wherein the signal indicating a possible lane change is passed to a transverse movement controller device of said vehicle in order to move said vehicle automatically into the target lane.

14. Method according to claim 1, wherein the method is actuated by request for an indication of a change in travel direction and the requested indication of a change in travel direction does not take place until a possible lane change is signalled.

* * * * *